UNITED STATES PATENT OFFICE.

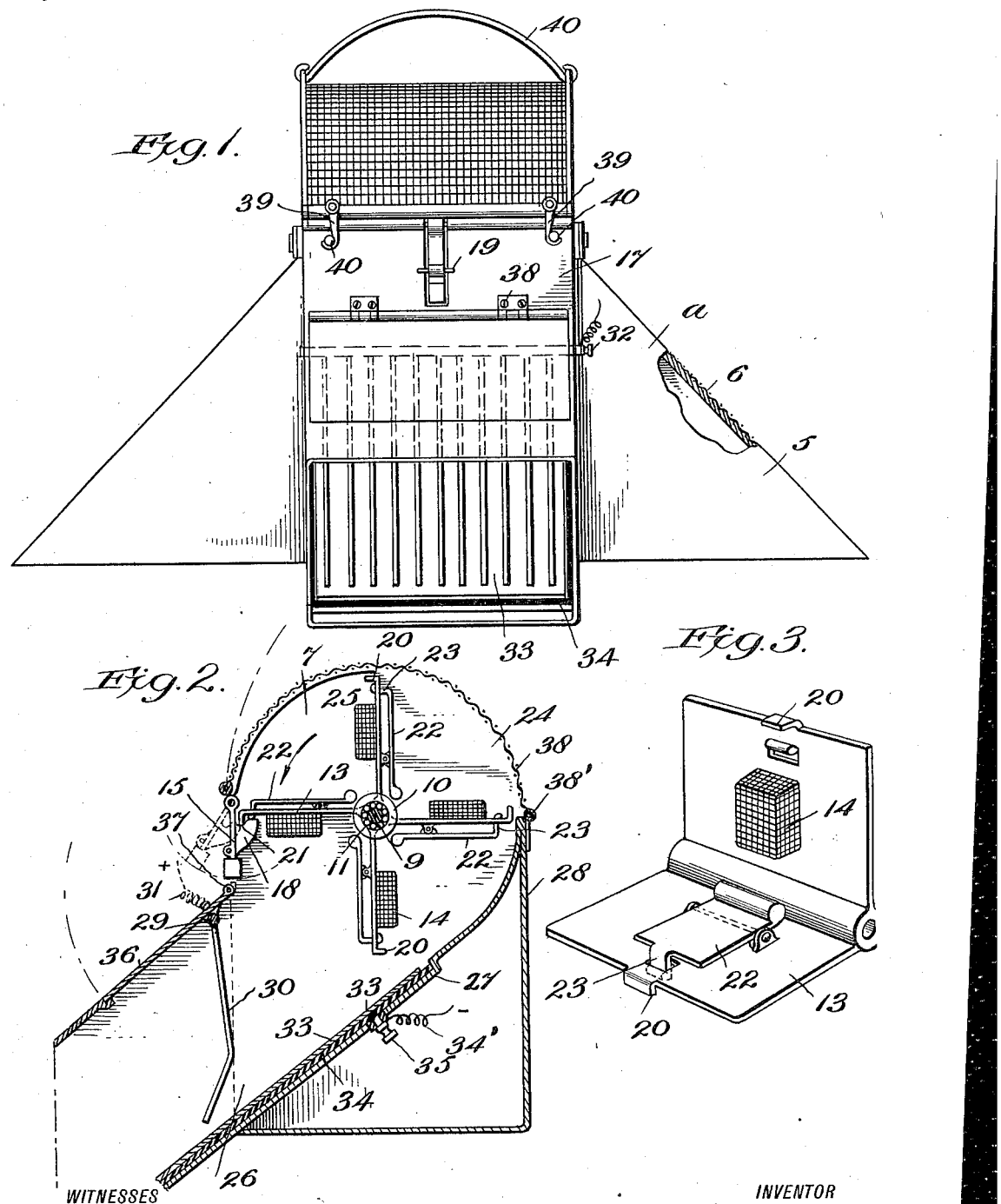

CHARLES E. PEACH, OF BROOKLYN, NEW YORK.

ANIMAL-TRAP.

1,090,750.

Specification of Letters Patent. Patented Mar. 17, 1914.

Application filed May 7, 1912. Serial No. 695,665.

*To all whom it may concern:*

Be it known that I, CHARLES E. PEACH, a citizen of the United States, residing at Brooklyn, in the county of Kings and State of New York, have invented new and useful Improvements in Animal-Traps, of which the following is a specification.

The general object of the invention is to adapt an animal trap to be operated in the ordinary manner by an animal to trap the same and to be further operated by the animal so as to be set to trap a second or succeeding animal.

Another object is to kill the trapped animals by electricity and to deliver them into a receptacle which may be located exteriorly of the building in which the trap is arranged.

Other objects will appear and be better understood from the following description taken in connection with the accompanying drawings in which:

Figure 1 is a side elevation of the device partly in section. Fig. 2 is a vertical cross sectional view of the same. Fig. 3 is a fragmentary perspective of the platform.

The trap herein designated generally by $a$ is by preference so constructed as to admit of its being placed in a room or other place or compartment where the rats are known to enter, or it may be arranged in a compartment made for it in the wall of a building where the rats have a runway, or between the beams of a floor.

The body 5 is preferably of metal and is a box like structure having slanting end walls which are shown in Fig. 1 and designated by 6, are preferably of woven wire of relatively small mesh or texture and which form tread surfaces for the animals. The upper ends of the tread surfaces 6 extend to the opposite ends of a vestibule 7 which communicates with the interior of the body 5. Arranged in the vestibule 7 so as to extend longitudinally thereof, is an axle 9 which supports a hub 10. A ball bearing 11 is interposed between the hub and axle so as to admit of easy rotation of the hub and the axle. A plurality of angularly disposed platforms 13 are carried by the hub 10 and each of such platforms is provided on one face with a suitable bait holder 14. A gravity latch 15 is arranged to swing in an opening in the front wall 17 of the body 5 and has a nose 18 which projects into the vestibule 7 and into the path of movement of the platforms 13. The inward movement of the nose is limited by a pin 19 carried by the latch bar 15 and arranged so as to abut the front wall 17 when the latch is vertical or substantially so as shown in Fig. 2. The longitudinal edge portions of the platforms 13 are bent as indicated by 20 in Figs. 2 and 3 such bent portions being received by a detent 21 in the nose 18, such detent being disposed as near as possible to the center of the gravity latch so as to prevent the platform with the rat thereon from pushing the latch outwardly. The tread plates 22 are pivoted on the faces of the platform opposite to those faces on which the bait holders 14 are arranged. The tongues 23—23 on the tread plates project through openings in the platforms so as to bear on the upper end of the nose 18 as shown in Fig. 2.

The end walls of the vestibule 7, one of which is shown in Fig. 2 and indicated by 24, have openings 25 conforming to the angular space between any two adjacent platforms. These openings are sufficiently large to admit of the passage of a rat therethrough after such rat has passed up the tread surface 6.

Projecting from the front wall 17 of the body 5 and below the gravity latch 15, is a chute 26. The bottom 27 of this chute inclines upwardly through the body 5 and connects with the upper edge of the rear wall 28 of the body and conforms in width to the length of the vestibule 7. Arranged in front of the opening in the front wall 17 and extending transversely of the chute is a shaft 29 which carries a plurality of depending rods 30, the lower ends of which are in juxtaposition to the bottom 27 of the chute. The leading in wire 31 from a suitable source of electric energy, is connected to a binding post 32 on one end of the shaft 29. A false bottom 33 is superimposed on an insulated body 34 suitably connected to the bottom 27 of the chute. The false bottom 33 is grounded on to a wire 34′ which connects to a binding post 35 insulated from the bottom 27 and connected to the false bottom 33.

In use and with the trap arranged so that the chute 26 will discharge into a suitable container, a rat entering one of the openings 25 moves onto the platform 13 which then forms the floor of the vestibule. In his endeavor to reach the bait which is now on the adjacent vertically extending platform, he moves onto the tread plate 22 and thereby depresses the said tread plate so as to push the latch outwardly and away from the down turned end portion 20 of the platform. The platform support now being removed the platforms with their hub turn as a wheel. This results in the precipitation of the rat into the chute before the platform on which the rat stood has made a quarter revolution. As soon as the platform on which the rat stood moves downwardly and beyond the nose 18, the latch moves to its normal position so as to intercept the succeeding platform when the latter moves into a horizontal position. It will be understood that from the impetus imparted to it by the weight of the rat, the wheel or series of platforms will have attained sufficient momentum to rotate the said wheel for a full quarter of a revolution. When deposited onto the false bottom 33, the rat slides into contact with the rods 30. This effects the turning of the shaft 29 and the moving upwardly of the rods 30 as a gate so as to permit the rat to slide or continue his journey through the chute. It will be observed however, that when the rat contacts with the rods 30, the electric circuit will be closed so that by the time the rat passes beyond the rods the current will have passed through his body and effected electrocution. The section 36 of the upper side of the chute to which the shaft 29 is connected, is hinged as at 37 so as to admit of lifting the rods through the upper side of the chute in order to effect the cleaning of the chute. The top 38 of the vestibule 7 has one side hinged as at 38' to the body 5 and its opposite side is detachably secured to the body through the coöperation of latches 39 and keepers 40. This peculiar arrangement of the top 38 admits of throwing the top backwardly and away from the vestibule and facilitates the cleaning of the platforms and the rebaiting of the trap. The top 38 also carries a bail or handle 40 which forms a convenient handle in carrying the trap from place to place.

Inasmuch as the animals cannot get at the bait which is contained within the holder 14 the bait which is originally placed in the said holder lasts for an indefinite time and practically the trap is permanently baited.

What I claim as new is:—

A trap comprising a casing a platform mounted therein for movement about an axis, and having at its free edge an angularly bent portion, a tread pivoted upon the platform and having a tongue which passes through the platform, a bar pivoted to the casing and hanging pendant beyond the edges of the platform and having at its side a laterally disposed nose portion, provided at its upper edge with a detent, the angularly bent portion of the platform normally engaging in the detent and the tongue normally engaging the upper edge of the nose portion at the opposite side of the detent from the bar.

In testimony whereof I affix my signature in presence of two witnesses.

CHARLES E. PEACH.

Witnesses:
Wm. H. Peach,
Frank J. Harff.